Figure 1:

Feb. 8, 1944.     G. A. RIVES     2,341,293
BEARING MEMBER AND METHOD OF MAKING THE SAME

Filed Nov. 16, 1938

Inventor:
George A. Rives
By
McCanna, Wintercorn & Morsbach
Attys.

Patented Feb. 8, 1944

2,341,293

UNITED STATES PATENT OFFICE 2,341,293

BEARING MEMBER AND METHOD OF MAKING THE SAME

George Andrew Rives, Rockford, Ill., assignor to Burd Piston Ring Company, Rockford, Ill., a corporation of Illinois Application November 16, 1938, Serial No. 240,880

2 Claims. (Cl. 309—44)

This invention relates to a method for preparing bearing surfaces, and to bearing members adapted for sliding or rotating movement in metal-to-metal contact, and to a piston ring made by said method.

The invention is herein described as applied to a piston ring or the like, but is not limited to this specific application, although it is of particular merit as applied to piston rings, and produces a new, novel and highly improved ring.

The difficulties heretofore encountered in the proper fitting of piston rings to cylinders, as, for example, in internal combustion motors, is well known. In fact, the greatest share of the actual fitting operation occurs after the rings are put into use in the motor. For this reason the motor or other device must be run under controlled conditions for a considerable period of time so as to allow the rings to properly seat against the cylinder walls. Under ideal conditions it is assumed that the rings will gradually wear away, wearing off small irregularities and the like, thus allowing the ring to come into closer proximity to the surface of the cylinder, and conform thereto. However, in actual practice, this operation requires a considerable length of time, and during this time there is constant danger of damage to the cylinder walls. As a matter of fact, in spite of all possible care, such damage occurs in a certain percentage of cases. Sometimes this is due to improper lubrication in the closely fitting parts of the engine. On other occasions it is due to variation in the relative hardness of the metal. Sometimes the metal of the ring sticks against the cylinder wall, as a result of which small pieces of metal are torn out of the ring and wedged between the piston and cylinder, thereby cutting a groove in the cylinder wall as the piston reciprocates. On other occasions small pieces of metal cling to the ring during the fabricating operations, possibly having been partly cut free, and when the ring is installed the particles work loose and become wedged between the moving parts. It will be seen that the danger of damage to the cylinder walls during the "run-in" period increases with the length of this period.

According to my method, the length of this "run-in" period is greatly reduced, and the danger of "run-in" difficulties is practically eliminated.

The trend in motor manufacturing is to produce cylinders with a lapped or honed finish. This surface finish is polished to a smooth mirror surface which is destroyed if scuffed or scratched by hard surfaces or spots on the piston rings. To refrigeration compressors, aircraft engines, ice feed Diesel engines, high grade truck, tractor and passenger car engines, as well as to many hydraulic cylinder applications, the maintenance of this mirror finished cylinder walled surface is of prime importance.

The present practice in making piston rings is to cast them in individual castings in stacked molds. The surface of each ring, therefore, contacts the molding sand and when the iron is poured into the mold there is, therefore, a marked tendency for the metal to surface chill. This is particularly true of small section rings such as used in refrigeration compressors and in automobile and aircraft engine cylinders. For instance, many refrigeration compressors use rings from $\frac{3}{4}''$ to $2''$ diameter and of a cross-section from $\frac{1}{16}'' \times \frac{1}{16}''$ to $\frac{3}{32}'' \times \frac{3}{32}''$. Automobile rings vary from about $2\frac{1}{4}''$ diameter to $3\frac{7}{8}''$ diameter and from $\frac{3}{32}'' \times \frac{1}{8}''$ cross-section to $\frac{5}{32}'' \times \frac{1}{4}''$ cross-section. In aircraft engines the rings vary from $4''$ to $8''$ diameter and from $\frac{1}{16}'' \times \frac{1}{8}''$ cross-section to $\frac{3}{16}'' \times \frac{5}{16}''$. It is therefore apparent that the surface exposed to chill is a very large amount in proportion to the weight of metal actually entering the ring, and consequently the chemical analysis of the metal must be varied to a substantial degree in accordance with the section of the ring in order to produce the desired physical characteristics and the proper graphite inclusions in accordance with the present invention.

The best practice known to the art of piston ring casting is to gate the ring in only one point. This means that the molten metal in flowing into the ring mold must travel at least one-half the circumference of the ring before joining with metal flowing from the opposite direction. All of these factors tend to produce rings having chilled surfaces or chilled spot inclusions near the surface. These hard spots are iron in which there is little if any free graphite. These hard spots are often not completely removed by the finishing, machining or grinding operations, and the result is that the ordinary commercial cast iron ring when completely finished frequently carries hard spots on the wearing surface which may scuff or mar the highly polished cylinder wall surface. In general, piston rings as now made in mass production have far from uniform distribution of the carbon both as regards the combined and the graphitic carbon and the surface of the ring, on account of the chilling effects mentioned above, frequently carries less graphitic carbon than the center portions of the ring. This is just the reverse of the requirements for a ideal piston ring in which the center of the ring cross-section should carry less carbon than the wearing edges in order to give the ring strength and resilience and in order to give more graphitic carbon in the wearing surfaces to prevent scraping and scoring and to give a soft graphitic surface and the proper wearing properties.

According to my invention I provide a ring in which the carbon distribution is such that the wearing surfaces of the ring carry nearly 100% graphitic carbon, the percentage of this carbon being reduced gradually and progressively away from the surface of the ring until the metal of average composition is reached. By this process it is possible to have a completely graphitic wearing surface grading down to about 3.25 graphitic carbon at a point .015" below the surface. The depth of this penetration may be controlled as desired, and I have produced rings where such gradation of the graphitic carbon content extends to .060" below the wearing surface of the ring though such depth is not generally necessary except in exceedingly large rings. It will be seen that this gradation of the graphitic carbon causes the metal to metal bearing between the surface of the ring and the surface of the cylinder wall to be established gradually by the wearing away of the outer portions of the surface, the percentage of metal to metal contact increasing gradually and thus preventing scoring, heating, scuffing and the like, and maintaining the "blow by" to a minimum during the wear-in period.

Figure 2:
Figure 3:

Figure 1 of the drawing shows in diagrammatic form the condition of a small fraction of the ring cross-section prior to the etching thereof, the blackened areas indicating graphite inclusions;

Fig. 2 is a diagrammatic showing of the manner in which the metallic constituents are removed by the etching steps, and Fig. 3 is a diagrammatic showing of the manner in which the particles of collodial graphite are precipitated in the interstices between the projecting graphite inclusions.

In preparing the piston ring of my invention I proceed first to the manufacture of a convential ring from gray cast iron, the iron having a suitable analysis for this purpose, as, for example, carbon from 3.75 to 3.95, silicon 2.70 to 2.90, manganese .55 to .70, phosphorous .40 to .50, and sulphur .040 to .055. Any gray iron or analogous alloy may be used which would normally be suitable for piston ring use, so far as this invention is concerned, the only limit being that the metal must be of such a nature that in its final form it contains substantial deposits of graphitic carbon distributed therethrough similar to those found in gray iron and analogous metals.

The completed ring is then immersed for about five minutes in a solution of hydrochloric acid made by diluting commercial muriatic acid of 18° Baumé with an equal amount of water. The precise concentration is not critical and may vary between relatively wide limits, and in like manner the time of immersion may vary considerably, the object being to etch the surface of the ring. Thereafter the ring is removed from this etching solution and immersed in a second etching solution made by diluting commercial sulphuric acid of 66° Baumé in a 1:4 ratio. The ring is etched in the latter bath for a period of about two and one-half minutes, whereupon it is removed, washed in hot water, and placed in a heating oven to dry. The time of immersion in the sulphuric acid bath as well as the strength of this bath may be varied between relatively wide limits. However, the result of the etching operations should be to remove a certain amount of the surface metal so as to expose on the surface of the ring, the graphite inclusions of the metal, which in this manner are caused to protrude from the surface so that they are partly embedded within the metal and partly protruding therefrom. So far as I have been able to determine, it is satisfactory to remove the metal to a depth of about .0003" to .0004", in the case of piston rings. The purpose of the washing operation is to remove the etching solution, and the rings are thereafter dried for the purpose of preventing corrosion during the interval between the washing and the subsequent step of the process.

This leaves the surface of the ring composed largely of graphite uncovered by the etching step and in a rough, pitted and porous condition. Into these pits and pores and over the exposed surface of the ring very finely divided or colloidal graphite is introduced by means of a penetrating liquid, and the colloidal graphite is thereafter fixed or flocculated in position on the surface. This is accomplished by immersing the ring in a graphite solution for a length of time sufficient to permit suitable penetration, two minutes or more being satisfactory, though doubtless a lesser time can also be used. The essential properties of this graphite mixture are that the graphite particles shall be of colloidal dimensions and be dispersed in a liquid phase. While I have found that a composition in which the graphite is dispersed in oil may be satisfactorily used, better results may be obtained by using, as a vehicle or the continuous phase, certain penetrating liquids. The liquids are well known on the market and are of diverse chemical nature, some being in the nature of modified alcohols but having in common the properties of low surface tension. One suitable material is that sold by Dupont under the trade-mark "Orel." In practice, I add colloidal graphite in oil, such, for example, as "Oildag" to "Orel" to produce about a 20% mixture of graphite in the liquid. I then immerse the rings in this mixture for a period of about two minutes. During this immersion the colloidal graphite is introduced into the pits and pores of the ring surface.

Upon removal of the rings from the graphiting liquid they are introduced into a solution for the purpose of precipitating or flocculating the colloidal graphite onto the surface of the ring so as to prevent this graphite, in so far as possible, from being subsequently picked up by the lubricating oil when the ring is placed in service and thus removed from the ring. Flocculation of the colloidal graphite may also be accomplished if desired by rubbing the rings at this point. In general, any of the common flocculating or precipitating agents may be used such, for example, as trisodium phosphate as well as such precipitants as zinc chloride and the like. In the preferred embodiment of the invention I use a 20% solution of zinc chloride in which I allow the rings to remain immersed for a period from two to five minutes. The time is not particularly critical so long as it is sufficient to cause flocculation, and this will vary somewhat depending upon the size of the object being treated and other factors, including concentrations. The ring is thereafter washed with water to eliminate the flocculating agent, and dried.

It will be seen that I have provided a method for the treatment of metal bearing surfaces which include rotating surfaces in bearing contact as well as surfaces in sliding contact, such, for example, as pistons and cylinders, each of which may be treated by the method, wherein the metal, including the hard metallic components thereof such as iron carbide, maganese carbide, iron phosphide, iron silicide, iron sulphide and manganese sulphide are etched from the surface so as to leave thereon a part of the graphite present in the iron. This graphite is, therefore, not something added to the surface, but the particles are integral with the metal. Furthermore, by etching out the metal and metal-like components, the surface is left in a porous and roughened condition, and is, in and of itself, a lubricant. I thereafter precipitate into the pores and pits a further amount of graphite in colloidal condition so that I thereby obtain a surface layer of graphite which might be said to be keyed to the metal. In other words, it is directly attached to the metal and remains in position where graphite produced thereon by other methods of production are easily displaced. This produces bearing surfaces which very rapidly and easily conform to the opposing bearing surface, thereby greatly reducing the "run-in" time of the bearing and greatly reducing the danger of damage during the period in which the bearings are coming into interfitting relationship.

An important result of my invention is the fact that bearing surfaces produced in this manner have highly increased wettability by oil. This is no doubt due to the fact that the interfacial tension of oil and graphite is much lower than that of oil and iron. Consequently, the oil film between the bearing parts is much more efficient when the surface is prepared according to my method, and is the case with plain metal surfaces. This is particularly important in connection with a piston ring for, if the oil film on the surface of a ring is broken during the "run-in" period, the only thing that will prevent scoring is the immediate re-establishment of a new film. This is more readily effected where a low interfacial tension exists, such as provided by surfaces prepared in accordance with this invention.

I have also produced a new and novel bearing member and a piston ring of novel characteristics. For example, it has been found that a piston ring made in accordance with this invention will usually "run-in" in a period of less than one-half hour. During this "run-in" period the oil consumption is considerably lower than has heretofore been possible, and the "blow-by" is substantially eliminated. For example, these rings have been placed in a racing motor immediately before a race, and without any preliminary "run-in" the car has been placed in a race and operated under the severe conditions attending such service with completely satisfactory performance.

I claim:

1. The method of preparing the surface of a piston ring formed of gray cast iron for improving the run-in properties thereof which comprises immersing said ring in a strong solution of a strong acid for sufficient time to dissolve the metallic constituents to a depth less than about .030" dependent upon the size of the ring and to cause indigenous surface deposists of graphite to protrude from said ring, washing said ring to substantially remove the acid therefrom, treating said ring with colloidal graphite dispersed in a penetrating fluid for sufficient time to cause a deposit of graphite over the surface of the ring to substantially cover the area between said surface deposits and form a composite bearing surface consisting essentially of graphite substantially completely covering the metal at said bearing surface, treating said ring with a flocculating agent to precipitate and fix the colloidal graphite particles onto the surface of said ring, washing said ring to remove the flocculating agent, and thereafter drying the ring.

2. A piston ring having improved run-in properties comprising a ring of gray cast iron having an average carbon content in excess of about 3.75%, a major portion thereof being in the form of graphitic inclusions dispersed through the metal, said ring having an etched annular bearing surface substantially completely covered by graphitic carbon, the proportion of carbon with respect to metallic ingredients decreasing toward the center of the ring and reaching about 3.75% carbon at a distance not more than about thirty thousandths of an inch from the surface, a part of said graphitic carbon being in the form of graphitic inclusions protruding from the metal and formed during the solidification of the metal and caused to project from the metal by etching away a part of the surface metal around the same and the remainder in the form of a firm adherent layer of precipitated, flocculated colloidal particles deposited on the metal between said protruding inclusions to cover substantially all of the metallic area therebetween.

GEORGE ANDREW RIVES.